April 30, 1968     E. JEANRENAUD     3,381,262
DEVICE FOR THE PROTECTION OF THE ELASTIC
MEMBER OF A COUPLING
Filed Feb. 14, 1966                                     3 Sheets-Sheet 2
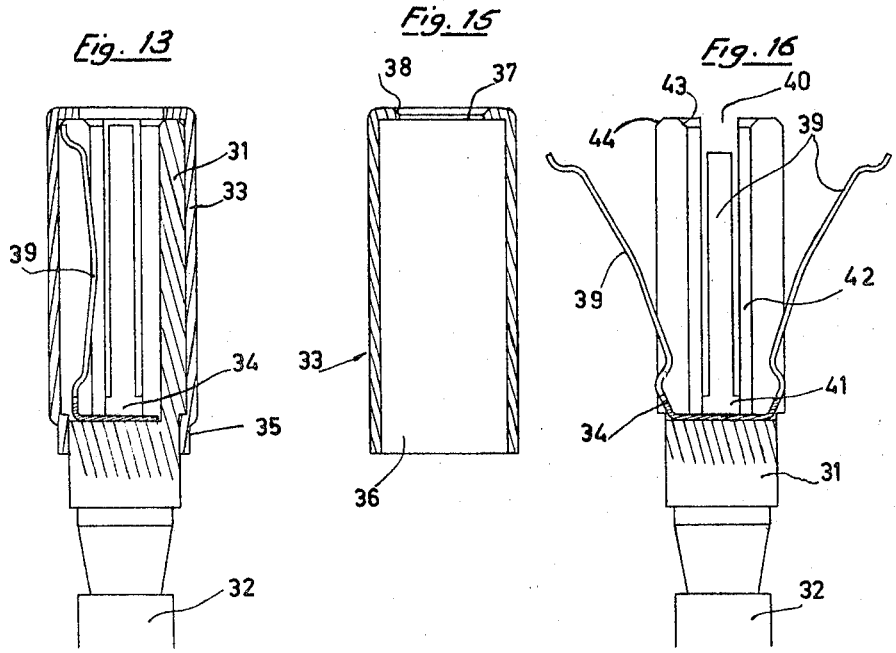
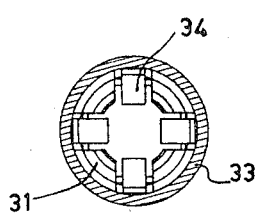
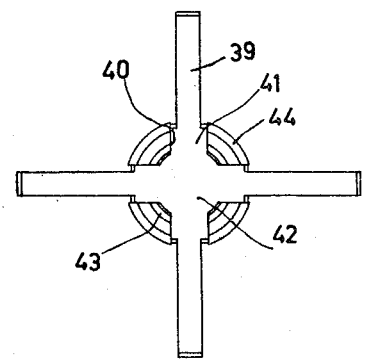

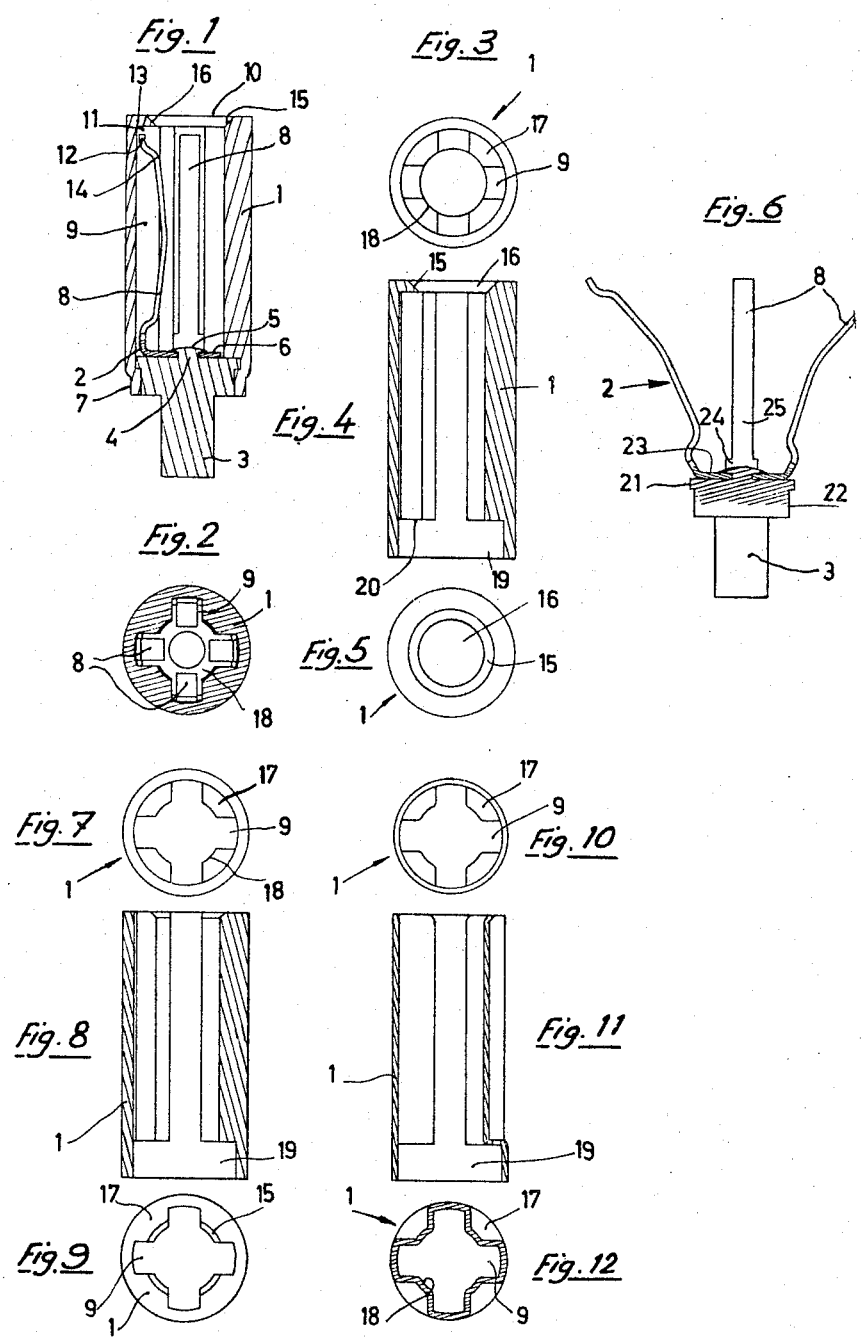

April 30, 1968    E. JEANRENAUD      3,381,262
DEVICE FOR THE PROTECTION OF THE ELASTIC
MEMBER OF A COUPLING
Filed Feb. 14, 1966            3 Sheets-Sheet 3
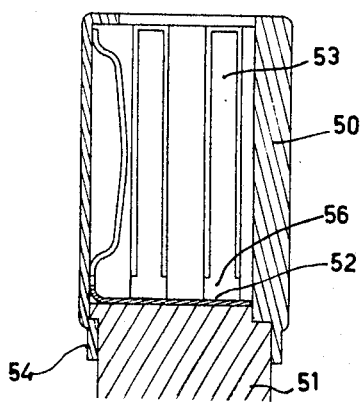
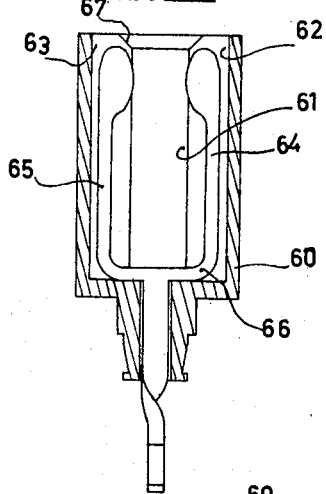
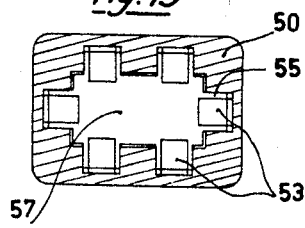
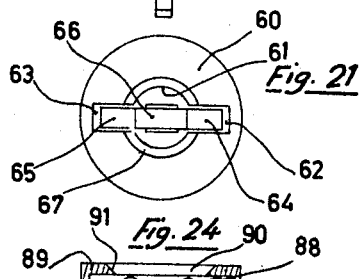
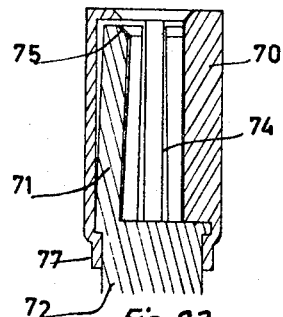
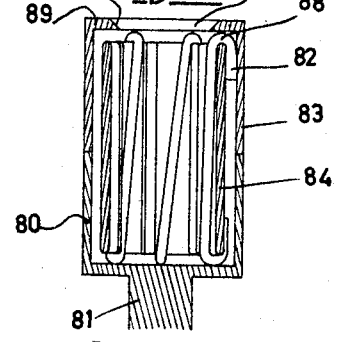
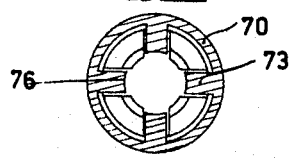
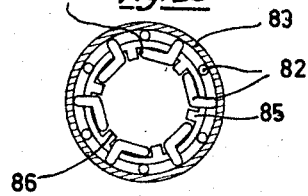

United States Patent Office 3,381,262
Patented Apr. 30, 1968

3,381,262
DEVICE FOR THE PROTECTION OF THE ELASTIC MEMBER OF A COUPLING
Edouard Jeanrenaud, Dole, France, assignor to Usine Metallurgique Doloise S.A., Dole, France, a company
Filed Feb. 14, 1966, Ser. No. 527,026
Claims priority, application France, Nov. 10, 1965, 37,960
3 Claims. (Cl. 339—258)

ABSTRACT OF THE DISCLOSURE

An electrical coupling with a socket and a plug, provided with an elastic piece constituted by multiple resilient elements each of which is protected in the interior of a groove formed in the receiving surface of the female member of the socket.

---

This invention relates to a coupling device.

Coupling devices with a male piece and a female piece are in general equipped with elastic members assuring an efficient joining and also maintaining the two pieces together. In the case where an electric contact must be established, it is often the elastic member which makes this contact.

In certain known devices, the elastic member comprises wires or laminas disposed according to helical or inclined generatrices, and held at each end by crimping. In the case of electric connectors, these devices of which the electric continuity was only assured by crimping, offered the disadvantages of being easily attacked by oxidation and thus easily damaged. Moreover, the male piece was often introduced in such a manner that it abutted against the elastic member in the female piece and risked damaging the elastic member mechanically.

To palliate these disadvantages, it has been proposed to use an elastic member with multiple elastic elements secured to a common base, and in the case of an electric connector, this member was electrically welded to the tail of the coupling to ensure the electric continuity between the member and the tail. The female member was equipped with an orifice preguiding the male member during its introduction. To obtain a relatively economic condition with respect to the dimensional tolerances of this guiding orifice, one was obliged to elongate this orifice to obtain satisfactory guiding.

In the case of an electric connection, this elongation offered the disadvantage of retarding the establishment of electric contact during the introduction of the male piece, the said electric contact not being able to be established in the zone of guiding.

In all cases, this elongated guiding orifice increased the cumbersomeness of the device, and it is desirable to be able to diminish the length of the guide.

Consequently, the invention proposes to provide a coupling device which does not have the disadvantages of known devices, which is of sure operation, and of great mechanical resistance.

To this effect, the invention is characterised in that one of the two coupling pieces of the device has a body and an elastic member with at least one elastic element recessed in the body.

Preferably the piece is the female piece, and the elastic elements are disposed in grooves in the body of the female piece with a part of each elastic element protruding from its corresponding groove when the device is uncoupled so that the male piece will engage the elastic elements when it is inserted into the female piece.

The invention will be better understood with reference to the following description made by way of non-limiting example and to the accompanying drawings in which FIGURES 1 and 2 represent in section a female piece according to the invention, in elevation and in a view from above respectively;

FIGURES 3, 4 and 5 represent respectively in a view from below, in elevational section and in a view from above, one component of the piece of FIGURES 1 and 2;

FIGURE 6 represents another component of the piece of FIGURES 1 and 2;

FIGURES 7, 8 and 9 are analogous to FIGURES 3, 4 and 5 for another embodiment of the invention;

FIGURES 10, 11 and 12 are analogous to FIGURES 3, 4 and 5 and to FIGURES 7, 8 and 9 for another embodiment of the invention;

FIGURES 13 and 14 represent a piece according to the invention, for another embodiment respectively in elevational section and in a sectional view from above;

FIGURE 15 represents in section one component of the piece of FIGURES 13 and 14;

FIGURES 16 and 17 represent another component of the piece of FIGURES 13 and 14, respectively in elevational section and in a view from above;

FIGURES 18 and 19 represent, respectively in section and in a sectional view from above, a piece according to invention for another embodiment;

FIGURES 20 and 21 are analogous to FIGURES 18 and 19, for still another embodiment;

FIGURES 22 and 23 are analogous to FIGURES 18 and 19, for still another embodiment, and FIGURES 24 and 25 are analogous to FIGURES 18 and 19 for another embodiment.

The invention is described hereafter with respect to several embodiments for electric connectors with a socket and a plug. It is to be understood that the invention is not limited to the embodiment described, but applies to all devices of elastic coupling with a male member and a female member.

Referring first of all to FIGURES 1 to 6, the connector comprises a body 1 of a socket, an elastic element 2 and a coupling tail 3. The elastic member 2 is rigidly fixed to the tail 3 by a rivet 4 joined to the tail 3 and set in its upper face 5. The electric continuity between the elastic member 2 and the tail of the coupling 3 is assured by a weld 6, for example an electric weld. The body 1 of the socket is set on the coupling tail 3 by a narrowing 7. The elastic member 2 is constituted by metal laminas 8 of which each is lodged in a groove 9 formed in the body 1 of the socket.

A clearance 11 appears between the interior shoulder 13 and the end 12 of each lamina 8. The laminas 8 project beyond the groove 9 from a point 14. The introduction of a male plug (not shown) is facilitated by the chamfer 15 on the entrance orifice 16, and the electric contact is made as soon as the end of the plug reaches the point 14 which is very near the upper face 10 of the body 1. The plug produces a compression of the laminas 8, the compression being limited by the amount by which the laminas 8 protrude out of the grooves 9. It is thus possible to make the laminas 8 work far from their elastic limit and to avoid thus a permanent deformation.

The body of socket 1 is represented more in detail in FIGURES 3 to 5. The body 1, cylindrical, can advantageously be obtained by a process of extrusion or the like.

The entrance orifice 16 with its chamfer 15 is of a diameter slightly larger than that of the pin which it must receive. The interior part of the body 1 has the grooves 9, each being separated from the two adjacent grooves by a partition 17 which has an interior face 18 intended to cooperate with the corresponding male pin. The face 18 has for a cylindrical pin, a section in an arc of a circle. The lower end of the body of the socket 1 has a cylindrical opening 19 which forms a shoulder 20 on the partition 17.

The coupling tail 3 is shown in FIGURE 6, the elastic member 2 being spread out. The tail 3 has a cylindrical crown 21 intended to cooperate with the cylindrical opening 19 of the body of the socket 1. The cylindrical crown 21 is prolonged, at its lower part, by a cylinder 22 of a smaller diameter and which is intended to be set in the narrowing 7 (FIGURE 1). The laminas 8 of the elastic member 2 are bound in relation to one another by a surface 23. The base of the laminas 8 have an enlargement 24 of width barely smaller than that of the groove 9 of the body 1, to assure the guiding of the laminas 8 during the connection, the body 25 of the laminas 8 being able on the other hand to play freely in the interior of the grooves 9.

FIGURES 7, 8 and 9 show a body of the socket 1 with grooves 9 separated by the partitions 17 having an interior face 18. The body 1 can be made by drawing or broaching followed by a cutting of operation. The body 1 also has in its lower part a housing 19 and at its upper part an entrance chamfer 15, this chamfer being scooped out in the partitions 17 and no longer on the upper face of the body 1 which is here eliminated.

FIGURES 10 to 12 represent a body 1 obtained by a process of stamping and having the grooves 9 separated by the partitions 17 having a central profile 18. The body 1 has also a housing 19, and the thickness of the sheet constituting the body 1 is constant.

FIGURES 13 to 17 show another embodiment of a socket according to invention. It comprises a body of the socket 31 which is secured to the coupling tail 32, an exterior envelope 33 and an elastic member 34 welded on the tail 32. The envelope 33 is set on the tail 32 in a narrowing 35. The envelope 33 is shown, in FIGURE 15, before being mounted. It comprises a cylindrical bore 36 terminated by an orifice 37 having an entrance chamfer 38.

FIGURES 16 and 17 show the body 31 on which is welded the elastic member 34 of which the branches 39 are here spread apart. The body 31 is integral with the coupling tail 32 and is split at its upper part by the grooves 40 of which the total height is equal to the height of the insertion part of the plug increased by the width of the base of the elastic member. The width of the grooves 40 is slightly larger than the width of the enlarged pieces 41 of the branches 39 of the elastic member 34. The body 31 has a central cylindrical bore 42 intended to receive the male pin, and possessing at its upper end a chamfer 42 to facilitate the introduction of this pin. A chamfer 44 at the exterior of the body 31 facilitates the mounting of the body 31 in the interior of the envelope 33.

FIGURES 18 and 19 show a modification of the socket according to the invention intended to receive a plug of rectangular section. The socket comprises a body 50 which can be obtained by extrusion, a coupling tail 51 on which is soldered an elastic member 52 comprising the laminas 53. The body 50 is set in a narrowing 54 on the coupling tail 51 and has grooves 55 which receive the laminas 53 of which the base 56 is enlarged to the width of the groove 55. The free space 57 at the interior of the body 50 is adapted to receive a plug (not shown) with a rectangular section.

FIGURES 20 and 21 show a socket according to the invention adapted for an elastic member of the "lyre" type. The body 60 of the socket has a central cylindrical hole 61 and two grooves 62 and 63 diametrically opposed receiving the arms 64 and 65 of the elastic member 66 which is shaped like a lyre. The bore 61 receives the male plug and has to this effect, at its upper part, a chamfer 67. The bore 61 can, for a non-circular pin, be replaced by any orifice of suitable profile.

FIGURES 22 and 23 show a modification of the socket according to the invention, the socket being slit and forming a contact. The socket comprises a body 70 which can be obtained by extrusion, a slotted socket 71, terminated by a coupling tail 72. The body 70 has some ribs 73 which cooperate with the slots 74 of the socket 71. The upper end of the sockets has a chamfer 75 facilitating the introduction of the pin (not shown). The end 76 of the ribs 73 has a profile adapted to receive the pin. The body 70 is set in the coupling tail 72 by the narrowing 77.

FIGURES 24 and 25 show a socket according to the invention of which the elastic member comprises metal wires inclined with respect to the generatrices of a hyperboloid of revolution. The socket comprises a body 80 integral with the coupling tail 81, metal wires 82, an exterior tube 83 forming a guard and an interior tube 84. The tube 84 has radial ribs 85 of which the end 86 cooperates with the pin (not shown) and which protect the wires 82 set in the groove 87 which are formed by the ribs 85. The grooves 87 can have the inclination of the wires 82 or can be not inclined and be of sufficient width for the inclination of the strand of the corresponding wire 82. The upper ends 88 of the wire 82 are also protected by the guard 89 of the tube 83. The guard 89 presents a cylindrical bore 90 with a chamfer 91 for the introduction of the pin.

The invention can also be applied to a male piece provided with an elastic member, for example a plug carrying an elastic member having a single or a multiple element.

Although the invention has been described with respect to particular embodiments, it is to be understood that it is not limited to those embodiments, and that one can make diverse modifications of materials, shapes, details and dimensions, without departing from the scope and the spirit of the invention, which is defined by the appended claims.

What is claimed is:

1. An electrical coupling comprising a socket member and a plug member having a part of a given height inserted in said socket member; said socket member comprising in combination an elongated body with a central cylindrical bore having at the upper end thereof an entrance chamfer for receiving said part of said plug member; a coupling tail integral with said body; a contact member electrically connected to said tail and having a base positioned transversely of the axis of said bore at the lower end of said bore adjacent said tail and a number of resilient contact fingers extending from said base, said fingers comprising an enlarged section integral with said base and portions extending longitudinally of said body; said tail having a diminished lower section; said body having in the upper part thereof a plurality of longitudinal grooves; said grooves having a total height greater than the length of said inserted part of said plug member when said plug member is inserted into contact with said base of said contact member; said grooves being present in a number equal to said number of resilient fingers, said fingers fitting therein; an exterior envelope fitting over said elongated body and over said contact fingers; said envelope being set on said tail over said diminished lower section thereof; said envelope having a cylindrical bore terminating at the upper end thereof in an orifice fitting over said entrance chamfer of said body.

2. An electrical coupling according to claim 1, wherein said resilient member has six rectangularly disposed contact fingers and the same number of similarly disposed grooves are provided in said body.

3. An electrical coupling section according to claim 1, wherein said resilient member is lyre-shaped.

References Cited

UNITED STATES PATENTS

| | | | |
|---|---|---|---|
| 2,391,425 | 12/1945 | Korn | 339—258 X |
| 2,549,577 | 4/1951 | Coyle | 339—258 X |
| 2,762,026 | 9/1956 | Knohl | 339—192 |
| 2,942,231 | 6/1960 | Cornell | 339—258 |
| 3,007,132 | 10/1961 | Anderson | 339—217 |
| 3,107,966 | 10/1963 | Bonhomme | 339—241 |
| 3,131,017 | 4/1964 | Mittler | 339—259 |

FOREIGN PATENTS

| | | |
|---|---|---|
| 704,057 | 2/1965 | Canada. |
| 726,662 | 3/1932 | France. |
| 317,343 | 12/1919 | Germany. |
| 669,220 | 12/1938 | Germany. |
| 336,612 | 10/1930 | Great Britain. |

OTHER REFERENCES

German printed application, 1,071,799, December 1959.
German printed application, 1,106,390, May 1961.
German printed application, 1,113,023, August 1961.

MARVIN A. CHAMPION, *Primary Examiner.*

P. TEITELBAUM, *Assistant Examiner.*